United States Patent [19]

Greene

[11] Patent Number: 4,636,325

[45] Date of Patent: Jan. 13, 1987

[54] HEAT EXCHANGE FLUID PARTICULARLY FOR CLOSED LOOP SOLAR ENERGY COLLECTING SYSTEMS

[75] Inventor: Jay S. Greene, Accokeek, Md.

[73] Assignee: Environmental Security Incorporated, Lancaster, Pa.

[21] Appl. No.: 723,451

[22] Filed: Apr. 15, 1985

[51] Int. Cl.$^4$ .............................................. C09K 5/00
[52] U.S. Cl. .................................... 252/75; 126/452; 126/900; 165/1
[58] Field of Search ...................... 252/73, 74, 75, 77, 252/355, 554; 126/452, 900; 165/1

[56] References Cited

U.S. PATENT DOCUMENTS

| | | | |
|---|---|---|---|
| 4,146,013 | 3/1979 | Foulke | 126/900 |
| 4,227,514 | 10/1980 | Spitzer | 126/900 |
| 4,239,035 | 12/1980 | Brooks et al. | 126/900 |
| 4,248,733 | 2/1981 | States, Sr. | 252/554 |

FOREIGN PATENT DOCUMENTS 2428225  1/1980  France .

Primary Examiner—Robert A. Wax
Attorney, Agent, or Firm—Nixon & Vanderhye

[57] ABSTRACT

A heat exchange liquid has a heat absorption rate between about 40,000 BTUs per pound—one million BTUs per pound, and is useful with any conventional solar energy collection equipment. The heat exchange liquid is passed in heat exchange relationship in a closed loop through a heat conductive conduit system into operative association with a solar collecting device, and absorbs heat at the device. The heat exchange liquid is non-combustible, non-toxic, and biodegradable and has a pH of between about 7.4–7.6. The major component of the concentrate which forms the heat exchange liquid is a linear alkylate sulfonate, non-ionic detergent and lauric superamide detergent mixture. It also includes dark colored (e.g. black) vegetable color, vitamin B-6, and bicarbonate soda or alfalfa. The concentrate can be mixed with water, and comprises about 20–99.9 percent of the heat exchange liquid, while the water comprises the remaining about 0.1 percent–80 percent.

15 Claims, 3 Drawing Figures

HEAT EXCHANGE FLUID PARTICULARLY FOR CLOSED LOOP SOLAR ENERGY COLLECTING SYSTEMS

BACKGROUND AND SUMMARY OF THE INVENTION

In many solar energy collecting systems, water, or water with an anti-freeze liquid, comprises the heat exchange liquid. However water is far from an ideal heat exchange liquid since it has a heat absorption ratio of only about 1200 BTUs per pound. Therefore the solar collecting and utilization equipment must be fairly bulky and expensive in order to achieve effective solar energy collection.

According to the present invention, a heat exchange liquid concentrate, and a concentrate and water mixture, are provided which have numerous advantages over conventional heat, exchange liquids utilized in solar energy collection systems, and other conventional heat exchange systems. The heat exchange liquid according to the invention is a non-combustible, non-toxic, biodegradable liquid with a pH of between about 7.4–7.6, and will not harm any conventional equipment presently in use in solar energy collecting systems. Thus the heat exchange liquid according to the present invention is essentially as environmentally sound as water; yet it has enormous practical advantages compared to water. The heat absorption rate of the heat exchange liquid according to the present invention is between 100,000 BTUs per pound (when the liquid comprises about 30 percent concentrate and 80 percent water), and about one million BTUs per pound (when the liquid comprises substantially pure concentrate). Circulating in a typical closed loop solar collection system, the heat exchange liquid according to the invention can be expected to produce at least one million BTUs per day in moderate sunlight.

The novel heat exchange liquid according to the present invention allows a design of solar energy collection and utilization systems that may be much smaller than conventional systems, or can have a higher rating given the same size. The heat exchange liquid according to the invention may be substituted in place of presently existing heat exchange liquids now in use in a wide variety of heat exchange applications, particularly solar energy collecting applications, and the heat exchange liquid according to the invention may be designed for use in any environment so that it will not boil or freeze (depending upon the percentage of concentrate to water in the liquid, a freezing point as low as $-100°$ F., and a boiling temperature as high as $950°$ F. can be obtained).

The heat exchange liquid concentrate according to the present invention includes as the major component thereof a linear alkylate sulfonate (i.e. a linear alkylbenzene sulfonate), non-ionic detergent and lauric superamide detergent mixture, such as those shown in U.S. Pat. 4,248,733 (the disclosure of which is hereby incorporated by reference herein). A superamide is a highly active fatty acid in the monoethanolamide group. The detergent mixture is mixed with a dark colored coloring agent, preferably black vegetable color comprising an amount of about 0.5–2 percent by weight of the detergent mixture. The concentrate also includes a means for increasing the heat absorption rate and the boiling temperature thereof, and preferably also for reducing the freezing temperature thereof. Such means preferably comprise vitamin B-6 in an amount of about 0.5–1 percent by weight of the detergent mixture, and either bicarbonate of soda (where lowering of the freezing point is necessary or desirable), or alfalfa (where lowering of the freezing temperature is not necessary). When utilized, the bicarbonate of soda is provided in an amount of about 3–50 percent by weight of the detergent mixture, and the alfalfa (i.e. finely ground alfalfa grains), when utilized, is in an amount of about 15–35 percent by weight of the detergent mixture.

The invention also comprises a method of effecting heat exchange between a surrounding environment and a heat exchange liquid flowing in a closed path, comprising the step of passing a heat exchange liquid comprising a non-combustible, non-toxic, biodegradable liquid having a heat absorption rate in the range between about 40,000 BTUs per pound—one million BTUs per pound in the closed path in heat exchange relationship with the surrounding environment. The heat exchange liquid is of course the preferred concentrate set forth above mixed with water, the concentrate comprising about 20–99.9 percent of the concentrate-water mixture.

The invention also comprises a method of collecting solar energy, and ultimately utilizing the energy collected, comprising the steps of: Disposing a solar energy heat collecting apparatus in a position to receive incident solar radiation thereon. Passing a heat exchange liquid in a closed loop within a heat conductive conduit system into operative heat exchange relationship with the solar energy heat collecting apparatus, the heat exchange liquid comprising a linear alkylate sulfonate, non-ionic detergent and lauric superamide detergent mixture, a dark coloring agent, and water. And at a heat sink, remote from the solar heat collecting apparatus, passing the heat exchange liquid into operative association with the heat sink so that heat collected by the heat exchange liquid is given up to the heat sink. The heat exchange liquid is of course the preferred concentrate set forth above mixed with water, the concentrate comprising about 20–99.9 percent of the concentrate-water mixture.

It is the primary object of the present invention to provide an environmentally sound, readily utilizable, high heat absorption rate heat exchange liquid, particularly adapted for use in solar energy collecting and like heat exchange systems. This and other objects of the invention will become clear an inspection of the detailed description of the invention, and from the appended claims.

DETAILED DESCRIPTION OF THE DRAWINGS

Figure 1:
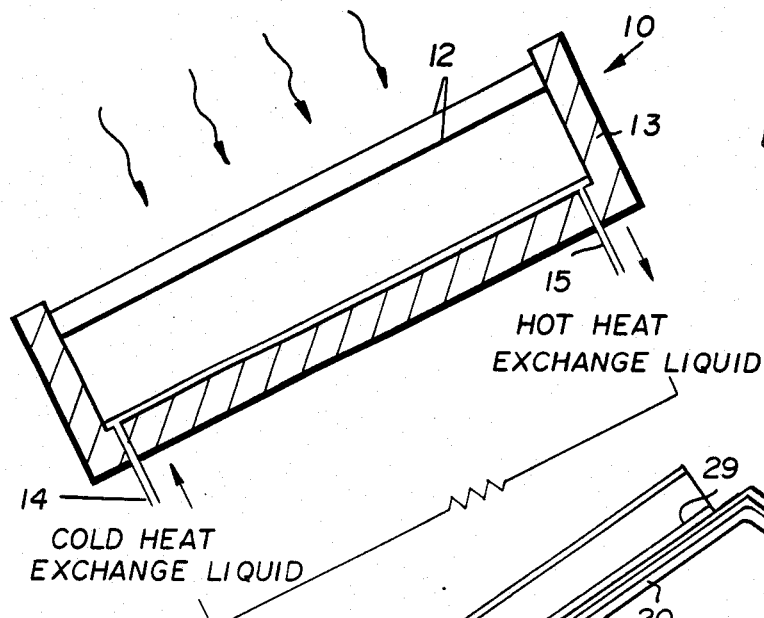
FIGS. 1 and 2 are side schematic views of two exemplary conventional solar energy collecting systems with which the heat exchange liquid according to the present invention is utilizable.

FIG. 1 schematically illustrates a conventional type of flat plate solar collector 10, which includes an absorbing surface 11 mounted in spaced relationship with a pair of transparent cover plates 12 by an insulating mounting structure 13. Cold heat exchange liquid is caused to be passed into inlet 14, passes in a closed system in heat conducting relationship with the absorbing surface 11, and passes upwardly in the collector 10 by action of the thermosiphonic effect to the outlet 15, heated heat exchange liquid passing out the outlet 15. The heat exchange liquid according to the present invention is eminently suited for use with the collector 10.

Figure 2:
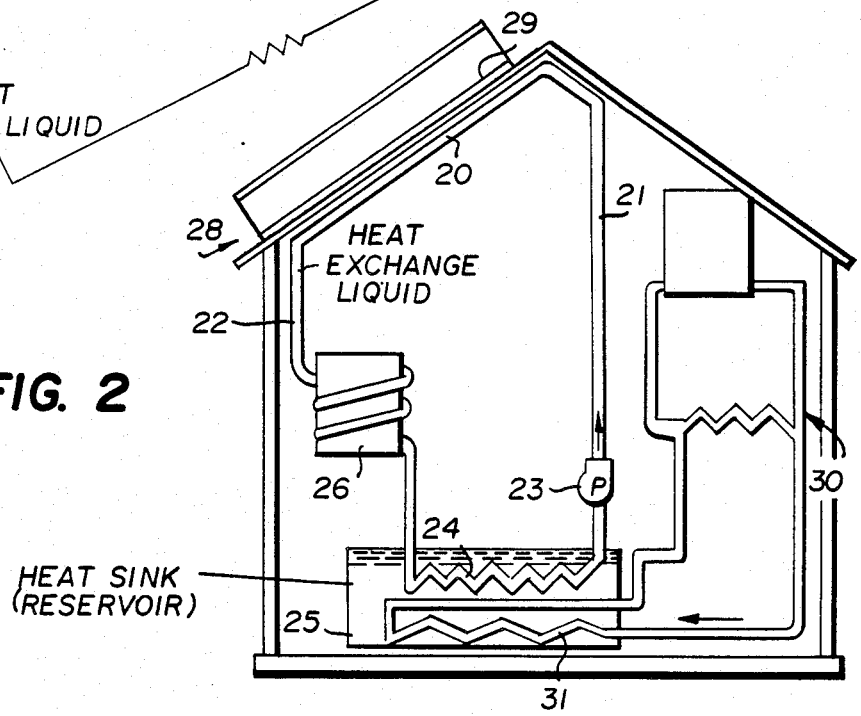

FIG. 2 illustrates another conventional system wherein heat exchange liquid is passed in a closed heat conductive conduit system including portion 20 operatively connected through pipes 21, 22 to a pump 23, heat exchanger 24 in a heat sink or reservoir 25, and a hot water tank 26. The collector 28 is of conventional type, including having a heat absorbing (e.g. black) bottom surface 29, with the conduit system 20 in heat exchange relationship with that surface 29. A heat distribution system 30, including the heat exchanger 31 in reservoir 25, removes the heat collected by the conduit system 20 and distributes it throughout the building with which it is associated. The heat exchange liquid according to the present invention is ideal for use in the conduit system 20.

Figure 3:
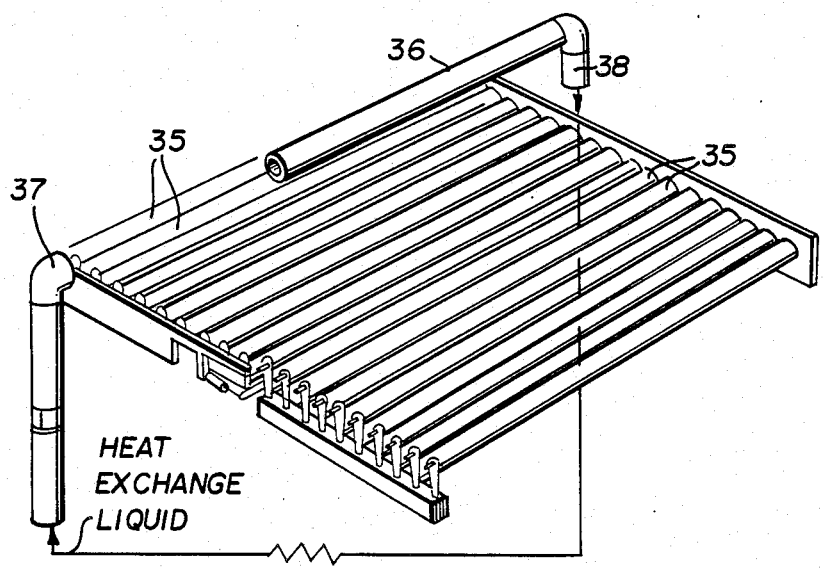
FIG. 3 is a perspective schematic view of a third exemplary conventional solar energy collecting system with which the heat exchange liquid according to the invention is utilizable.

A third exemplary conventional solar collecting device is illustrated schematically in FIG. 3, and includes a plurality of rotating mirrored facets 35 which are adapted to reflect sunlight and focus it on the dark-colored conduit 36 of heat conductive material. A heat exchange liquid flows from inlet 37 through the conduit 36 to outlet 38, and absorbs the solar heat energy incident upon the conduit 36 from the facets 35. The heat exchange liquid according to the present invention is also ideal for the system illustrated in FIG. 3.

While the drawings illustrate only three conventional solar energy collecting systems with which the heat exchange liquid according to the present invention is utilizable, it is to be understood that the heat exchange liquid according to the present invention is utilizable with essentially all conventional solar energy collecting equipment, and a wide variety of other heat exchange devices.

The heat exchange liquid according to the invention comprises a concentrate which may be mixed with water. Typically the liquid would include about 20–99.9 percent concentrate, and about 0.1–80 percent water. Other liquids could also be added to the concentrate-water mixture as long as they did not have any deleterious effect on the collecting or utilization equipment, etc.

The heat exchange liquid according to the present invention is non-combustible, non-toxic, and biodegradable, and has a pH of between about 7.4–7.6, and a heat absorption capacity of between about 40,000 BTUs per pound (for 20 percent concentrate) and about one million BTUs per pound (substantially pure concentrate). The heat exchange liquid is capable of being pumped by conventional pumps used in solar energy collection systems, and has a typical viscosity of about 1,000 centipoise.

The major component of the concentrate of the heat exchange liquid according to the invention is a linear alkylate sulfonate, non-ionic detergent and lauric superamide detergent mixture. This detergent mixture typically comprises about 40–70 percent by volume of the concentrate.

A second main component of the concentrate according to the invention comprises a dark coloring agent. Black is the preferred color of the coloring agent, although other colors may be utilized depending upon the particular circumstances (e.g. dark blue, etc.). The coloring agent preferably is black vegetable color, with other dark food coloring, and is provided in the concentrate in an amount of about 0.5–2 percent by weight of the detergent mixture.

The concentrate also preferably comprises means for increasing the heat absorption rate and the boiling temperature of the concentrate, and also preferably for lowering the freezing point thereof. A material that is particularly useful for accomplishing these functions is vitamin B-6. In the preferred embodiment the vitamin B-6 is provided in the concentrate in an amount of about 0.5–1 percent by weight of the detergent mixture.

Other materials for increasing the heat absorption capacity and the boiling temperature of the concentrate include bicarbonate of soda and alfalfa. Where it is desirable to lower the freezing temperature of the concentrate, bicarbonate of soda is utilized in an amount of about 3–50 percent by weight of the detergent mixture. Where lowering of the freezing temperature is not necessary or desirable, alfalfa is substituted for the bicarbonate of soda in an amount of about 15–35 percent by weight of the detergent mixture.

In the mixing of the concentrate adcording to the invention, typically small amounts of water are utilized to liquify the components added to the detergent mixture prior to mixing the concentrate. Therefore the concentrate according to the invention will usually always have at least some water. Depending upon the percentage and nature of the components added to the detergent mixture, and the percentage of concentrate to water in the final heat exchange liquid, the freezing temperature of the heat exchange liquid may be as low as about −100° F., and its boiling point may be as high as 950° F.

The following chart indicates the BTU per pound output of various heat exchange liquids according to the present invention. In chart I below, the components added to the detergent mixture to provide the concentrate included 1 percent vitamin B-6, 3 percent bicarbonate of soda, and 1 percent black vegetable dye.

CHART A

| APPROXIMATE PERCENTAGE OF CONCENTRATE (Remainder Water) | HEAT ABSORPTION RATE (BTU OUTPUT PER LB.) |
|---|---|
| 100 percent | 968,485 |
| 90 percent | 781,734 |
| 80 percent | 614,982 |
| 70 percent | 468,231 |
| 60 percent | 341,479 |
| 50 percent | 234,728 |
| 40 percent | 147,976 |
| 30 percent | 81,225 |
| 20 percent | 34,522 |

The following chart II represents the maximum percentage of concentrate in the heat exchange liquid that should be utilized when the lowest outside air temperature that could possibly be expected is as indicated:

CHART II

| TEMPERATURE | % CONCENTRATE IN HEAT EXCHANGE LIQUID |
|---|---|
| −60 Deg F. | 90 |
| −30 Deg F. | 80 |
| −0 Deg F. | 70 |
| −20 Deg F. | 60 |
| 32 Deg. F. | 50 |
| 32 to 42 Deg F. | 40 |

CHART II-continued

| TEMPERATURE | % CONCENTRATE IN HEAT EXCHANGE LIQUID |
| --- | --- |
| 42 to 50 Deg F. | 30 |

The following chart III presents performance data based upon closed solar operations wherein the solar energy collecting system has the indicated operating temperature above air temperature (e.g. 10° F. above air temperature, 30° F. above air temperature, etc.). The data represents average daily BTU production at that temperature, not maximum BTU output, and is presented as BTUs per pound of heat exchange liquid:

CHART III

| % CONCEN-TRATE IN MIX | BTUs (10° F.) | BTUs (30° F.) | BTUs (60° F.) |
| --- | --- | --- | --- |
| 100 | 14,850 | 44,550 | 89,100 |
| 90 | 14,340 | 43,020 | 86,040 |
| 80 | 13,820 | 41,460 | 82,920 |
| 70 | 13,310 | 39,930 | 79,860 |
| 60 | 12,790 | 38,370 | 76,740 |
| 50 | 12,280 | 36,840 | 73,680 |
| 40 | 11,760 | 35,280 | 70,560 |
| 30 | 11,250 | 33,750 | 67,500 |

The heat exchange liquid according to the present invention will not harm conventional solar collecting systems, and will not break down significantly during use. One exemplary heat exchange liquid according to the invention which was utilized in a typical conventional closed loop solar system comprised about 35 percent by volume of concentrate and 65 percent by volume water. To the detergent mixture part of the concentrate were added 1 percent by weight of the detergent mixture of vitamin B-6, 3 percent by weight of the detergent mixture of bicarbonate of soda, and 1 percent by weight of the mixture black vegetable dye. The heat exchange liquid functioned successfully in the solar collecting system, and had a heat absorption capability far exceeding that of the heat exchange liquid (water) that it replaced.

It will thus be seen that according to the present invention an effective heat exchange liquid, and methods of utilization thereof, have been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent formulations and methods.

What is claimed is:

1. A heat exchange liquid concentrate comprising: a linear alkylbenzene sulfonate, non-ionic detergent and lauric superamide detergent mixture; a dark coloring agent; and about 0.5-1 percent by weight of the detergent mixture of vitamin B6, and about 3-50 percent by weight of the detergent mixture of bicarbonate of soda.

2. A liquid concentrate as recited in claim 1 wherein the coloring agent is black vegetable color in the amount of about 0.5-2 percent by weight of the detergent mixture.

3. A liquid concentrate as recited in claim 2 mixed with water, said liquid concentrate comprising about 20-99.9 percent of the volume of the concentrate-water mixture.

4. A heat exchange liquid comprising:
water; and
a liquid concentrate intimately mixed with the water, the liquid concentrate comprising about 20-99.9 percent of the volume of the heat exchange liquid, and comprising: a linear alkyl benzene sulfonate, non-ionic detergent and lauric superamide detergent mixture; dark food coloring; vitamin B-6; and a material selected from the group consisting essentially of bicarbonate of soda and finely ground alfalfa grain.

5. A heat exchange liquid as recited in claim 4 wherein said vegetable color comprises black vegetable color, and comprises about 0.5-2 percent by weight of the detergent mixture, the vitamin B-6 comprises about 0.5-1 percent by weight of the detergent mixture, and the concentrate also comprises about 3-50 percent by weight of the detergent mixture of bicarbonate of soda.

6. A heat exchange liquid as recited in claim 3 wherein said vegetable color comprises black vegetable color, and comprises about 0.5-2 percent by weight of the detergent mixture, the vitamin B-6 comprises about 0.5-1 percent by weight of the detergent mixture, and the concentrate also comprises alfalfa in an amount of about 15-35 percent by weight of the detergent mixture.

7. A method of effecting heat exchange between a surrounding environment and a heat exchange liquid flowing in a closed path, comprising the step of passing a heat exchange liquid comprising a non-combustible, non-toxic, biodegradable liquid having a heat absorption capacity in the range between about 40,000 BTUs per pound-one million BTUs per pound in the closed path in heat exchange relationship with the surrounding environment wherein the heat exchange liquid comprises: a linear alkylbenzene sulfonate, non-ionic detergent and lauric superamide detergent mixture; a dark coloring agent; and a means for increasing the heat absorption capacity and boiling temperature of the detergent mixture.

8. A method as recited in claim 7 wherein said passing step is further practiced by passing in said closed path said liquid wherein said dark coloring agent is vegetable coloring, and wherein said means for increasing the heat absorption rate and the boiling temperature of the detergent mixture is one or more materials selected from the group consisting essentially of vitamin B-6, bicarbonate of soda, and finely ground alfalfa grain.

9. A method as recited in claim 8 wherein said step of passing the heat exchange liquid in said closed path is further practiced by passing said liquid wherein the vegetable coloring is black, and wherein the means for increasing the heat absorption rate and boiling temperature of the detergent mixture comprises about 0.5-1 percent by weight of the detergent mixture of vitamin B-6, and about 3-50 percent by weight of the detergent mixture of bicarbonate of soda, and wherein the black vegetable coloring comprises about 0.5-2 percent by weight of the detergent mixture.

10. A method as recited in claim 8 wherein said step of passing the heat exchange liquid in said closed path is further practiced by passing said liquid wherein the vegetable coloring is black, and wherein the means for increasing the heat absorption rate and boiling temperature of the detergent mixture comprises about 0.5-1 percent by weight of the detergent mixture of vitamin B-6, and about 15-35 percent alfalfa by weight of the detergent mixture, and wherein the black vegetable coloring comprises about 0.5–2 percent by weight of the detergent mixture.

11. A method as recited in claim 8 wherein said passing step is also practiced by passing said heat exchange liquid in said closed system with said liquid also including about 0.1 percent–80 percent water by volume.

12. A method as recited in claim 7 wherein said surrounding enviroment comprises a solar energy collection apparatus, and wherein said passing step is practiced by passing said heat exchange liquid in contact with a heat conductive conduit system into heat exchange relationship with said solar energy collecting apparatus.

13. A method of collecting solar energy, and ultimately utilizing the energy collected, comprising the steps of:
  (a) disposing a solar energy collecting apparatus in a position to receive incident solar radiation thereon;
  (b) passing in a closed loop within a heat conductive conduit system a heat exchange liquid into operative heat exchange relationship with said solar energy heat collecting apparatus, said heat exchange liquid comprising a linear alkylbenzene sulfonate, non-ionic detergent and lauric superamide detergent mixture, a dark coloring agent, and water; and
  (c) at a heat sink, remote from said solar energy collecting apparatus, passing said heat exchange liquid into operative association with the heat sink so that heat collected by the heat exchange liquid is given up to the heat sink.

14. A method as recited in claim 13 wherein step (b) is further practiced by passing said heat exchange liquid which also includes a means for increasing the heat absorption rate and boiling temperature of the detergent mixture, the means comprising one or more materials selected from the group consisting essentially of vitamin B-6, bicarbonate of soda, and finely ground alfalfa grain.

15. A method as recited in claim 14 wherein step (b) is further practiced by passing the heat exchange liquid which includes about 20–99.9 percent a liquid comprising: said detergent mixture; about 0.5–2 percent by weight of the detergent mixture of black vegetable color; about 0.5–1 percent by weight of the detergent mixture of vitamin B-6; and about 3–50 percent by weight of the detergent mixture of bicarbonate of soda.

* * * * *